N. B. WALES.
POWER PLANT FOR AUTOMOBILES.
APPLICATION FILED JULY 25, 1917.

1,353,099.

Patented Sept. 14, 1920.

N. B. WALES.
POWER PLANT FOR AUTOMOBILES.
APPLICATION FILED JULY 25, 1917.
1,353,099.
Patented Sept. 14, 1920.
3 SHEETS—SHEET 2.
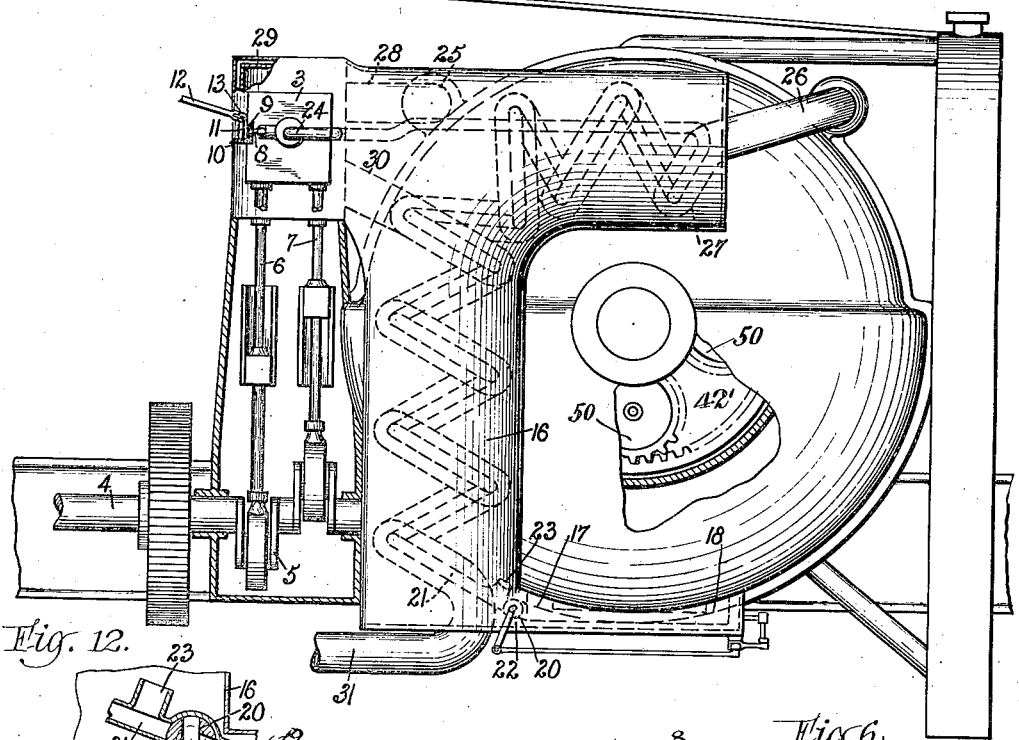
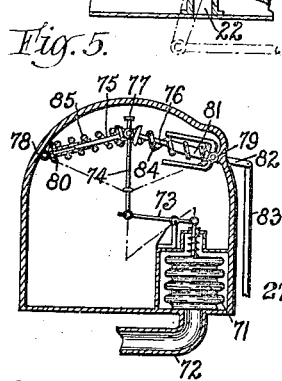
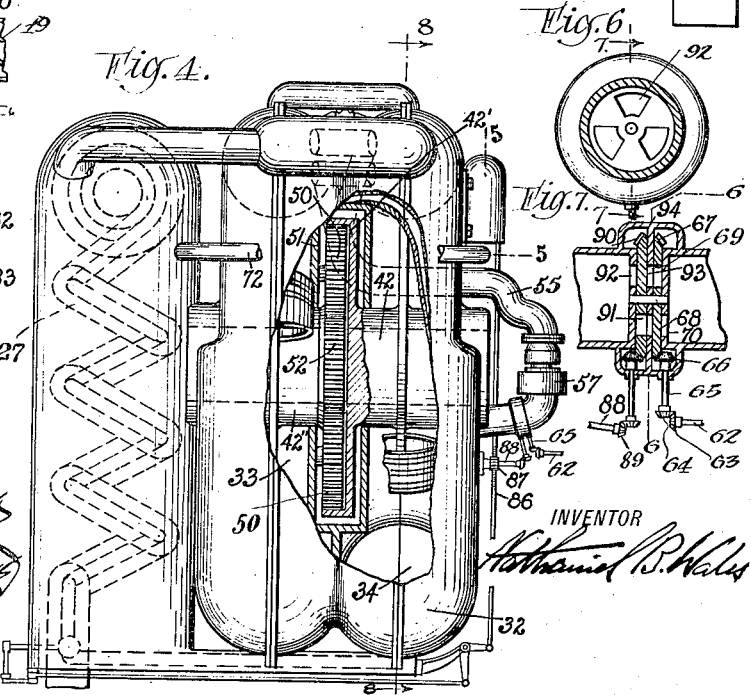
WITNESSES.
INVENTOR

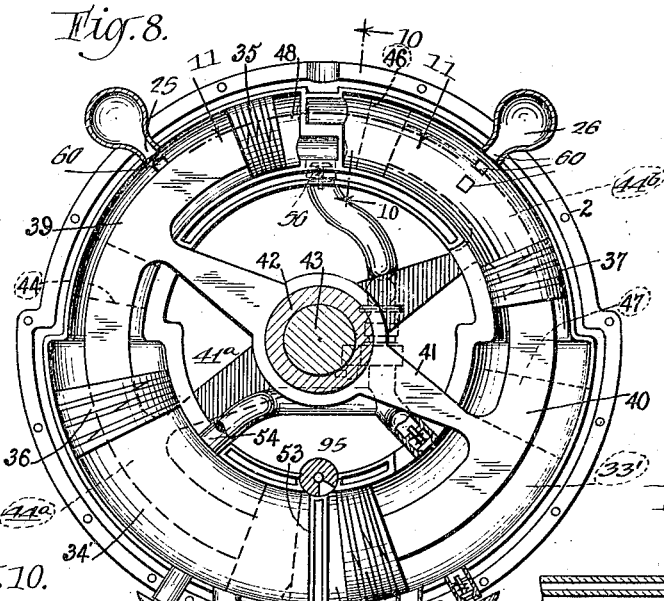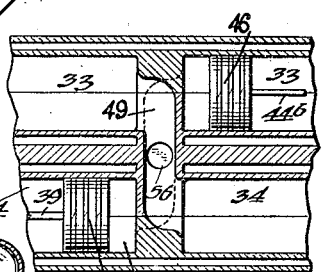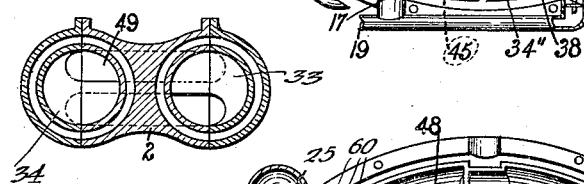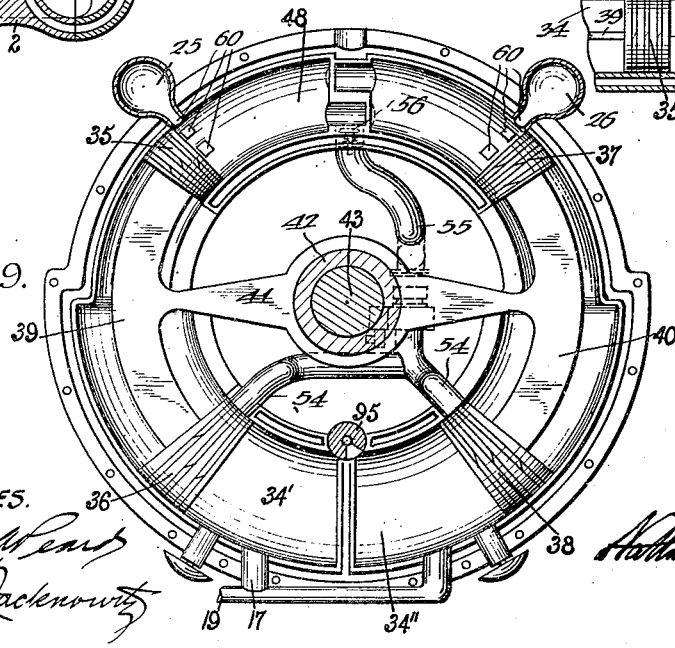

UNITED STATES PATENT OFFICE.

NATHANIEL B. WALES, OF NEW YORK, N. Y., ASSIGNOR, BY MESNE ASSIGNMENTS, TO WALES MOTORS CORPORATION, A CORPORATION OF DELAWARE.

POWER PLANT FOR AUTOMOBILES.

1,353,099.     Specification of Letters Patent.      Patented Sept. 14, 1920.

Application filed July 25, 1917. Serial No. 182,692.

*To all whom it may concern:*

Be it known that I, NATHANIEL B. WALES, a citizen of the United States, and a resident of the city of New York, borough of Manhattan, in the county and State of New York, have invented a new and Improved Power Plant for Automobiles, of which the following is a full, clear, and exact description.

This invention relates to power plants and particularly to a power plant adapted for vehicles, and has for an object the provision of an improved construction especially adapted for use on automobiles whereby gearing and clutches are eliminated.

Another object of the invention is to obtain, in an internal combustion engine, an approximately constant compression pressure throughout the entire load range of the engine.

Another object of the invention is the provision of means which has the ability to mix the hydrocarbon fuel with the air used in the cycle prior to its entry into the working cylinder and ignite the same throughout the engine load range by the heat generated by the compression stroke, varying the volume of the working charge yet igniting it by an approximately constant temperature derived from and by an approximately constant compression.

A further object of the invention is to provide a power plant for automobiles or other vehicles wherein the power is secured from an expansion engine, as for instance, an air engine, and compressed air is provided by a compressor the explosion engine operating independently of the air engine.

A still further object of the invention is to provide an internal combustion engine in which opposing pistons, together with the casing, provide a clearance volume in which a combustible mixture is exploded for producing the necessary power and for distributing the same in an even manner.

A still further object of the invention is to provide a power plant with an internal combustion engine with oppositely moving pistons acting as driving members and also as compressors, the same being associated with a compressed air receiving tank and heating means extending from the exhaust of the explosion chamber.

A still further object of the invention is to provide an internal combustion motor using the very highest working pressure both on the compression and expansion strokes as well as the compressor range resulting from the expanding of the gas in such a way that there will be a perfect balance at all times during the continuous operation of the device.

A still further object of the invention is to provide an internal combustion engine which will use substantially any fuel oil, as kerosene, gasolene, alcohol, or other oils.

In the accompanying drawings:—

Fig. 3 is an enlarged side view of the power plant shown in Fig. 1, certain parts being broken away for better illustrating the structure.

Fig. 4 is an edge view of the structure shown in Fig. 3.

Fig. 5 is a detail fragmentary sectional view through Fig. 4 approximately on line 5—5.

Fig. 6 is an enlarged fragmentary sectional view through Fig. 7 on line 6—6.

Fig. 7 is a sectional view through Fig. 6 on line 7—7.

Fig. 8 is a sectional view through Fig. 4 approximately on line 8—8.

Fig. 9 is a view similar to Fig. 8 but showing the parts in a different position.

Fig. 10 is a detail fragmentary transverse sectional view through Fig. 8 on line 10—10.

Fig. 11 is a fragmentary detail horizontal sectional view through Fig. 8 on line 11—11.

Fig. 12 is a detail fragmentary sectional view through the air valve shown in Fig. 3.

Figure 1:
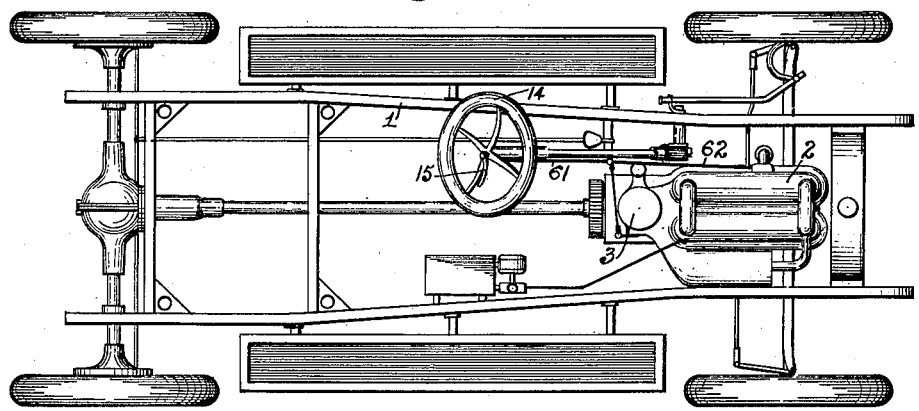
Figure 1 is a top plan view of the running gear and associated parts of an automobile, with an embodiment of the invention aplied thereto.
Figure 2:
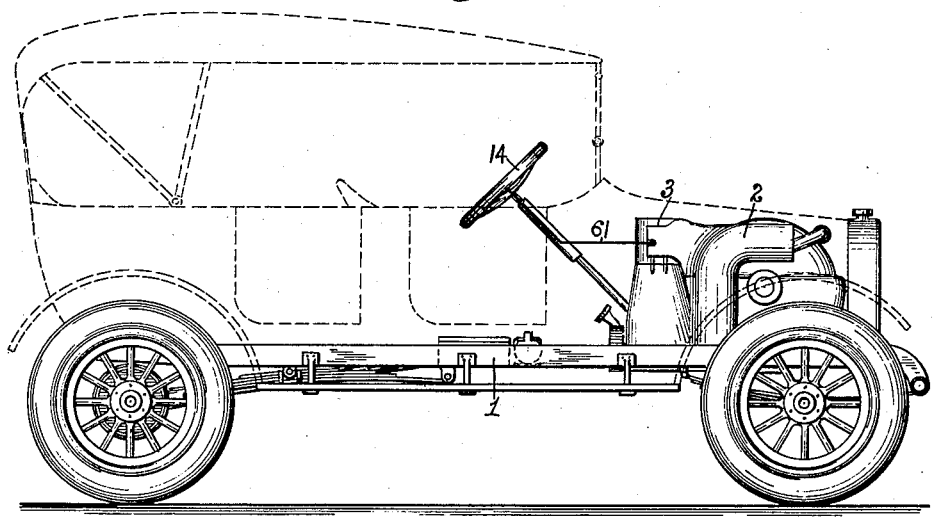
Fig. 2 is a side view of the structure shown in Fig. 1, the upper part of the automobile being shown in dotted lines.

Referring to the accompanying drawings by numerals, 1 indicates an automobile of any desired kind, which is provided with a power plant embodying the invention, the same consisting of an internal combustion engine 2 and an expansion engine 3 of any desired type, as for instance, the ordinary structure commonly used with steam or with compressed air supplied from any source, the same consisting in the present instance of two cylinders, pistons and piston rods and associated parts for driving shaft 4 through suitable cranks 5, as shown in Fig. 3. It is of course understood that the engine 3 is provided with valves and other parts for causing a proper operation of the piston rods 6 and 7. The compressed air is turned on and off by rod 8 connected with the beveled pinion 9 which meshes with pinion 10, while pinion 10 is connected with shaft 11 operated from a member 12 through the universal joint 13. Member 12 is a rod or other means for extending to the steering wheel 14, as shown in Fig. 1, and operated by an arm or lever 15.

From the above it will be seen that the air is turned on and off by the lever 15 which acts as a throttle, and the internal combustion engine 2 is not in any way interfered with by the driver when slowing down, starting up or stopping. It will also be noted that there are no clutches to turn in and out but merely one lever to operate, namely, lever 15, which will turn on or off the expansion fluid, which in this instance is compressed air in a highly heated condition. This will give more or less power as desired, according to the amount of air used so that the shaft 4 may be driven at any desired speed.

In order that the engine 3 may receive compressed air and utilize the same to the fullest extent, air is supplied to the tank or reservoir 16 (Fig. 3) from a compressor hereinafter fully described, said compressor supplying the air through the pipes 17 and 18 to a connecting pipe 19, said connecting pipe being supplied with a two-way valve 20 whereby the air may be switched on to the superheating pipe 21 or may be switched on to the outlet 22 and thereby discharge into the atmosphere. When not discharging into the atmosphere the compressed air will enter the superheating pipe or coil 21 and either be discharged at the outlet 23 into the tank 16 or will pass through the superheater coil 21 and be eventually discharged at 24 into the engine 3. This will produce as great an expansion as possible and, consequently, produce the maximum power from a given quantity of compressed air. In case there is a larger amount of compressed air entering the pipe 21 than passing into the engine, part of the air will be discharged out the outlet 23 into tank 16, but if the amount of compressed air used by the engine is more than that supplied to the pipe 21 some of the compressed air in the tank 16 will pass into the pipe 21 through the outlet 23 and thereby produce a more or less even continuous supply of fluid under pressure.

The exhaust manifolds 25 and 26 are connected to a single coil 27 in the tank 16, as shown in Fig. 3, so as to heat this coil and, consequently, raise the temperature of the compressed air so as to place the air under an even higher tension. The exhaust from the manifold 25 first passes through the passageway 28 into the jacket 29 around the engine 3 and from thence through the passageway 30 into the coil 27. From the end of the coil 27 the exhaust may lead through a pipe 31 to a muffler or to any other discharge member. The passage of the exhaust in the manner set forth heats the coil 27 and, consequently, the compressed air in tank 16 and coil 27 is heated and thereby increased in volume so that the engine 3 utilizes the maximum effort of the internal combustion engine 2 by effectively utilizing its exhaust heat.

In order to provide air under pressure to the tank 16 engine 2 is provided, which is formed with a compressor or compressing section, as shown more or less in detail in Figs. 8 and 9, from which it will be seen that an explosion takes place in part of the engine 2 and an air compression takes place in another part. The moving parts and the cylinders are formed circular or arc-shaped but it will of course be understood that the principle of compression and the principle of providing a common cylinder acting as an explosion chamber may be exemplified not only in a circular structure but in a rectangular structure without departing from the spirit of the invention. In the disclosure shown in the drawings the casing 32 is provided which is formed with chambers 33 and 34, said chambers being identical in construction and provided with operating members of identical structure and arranged to operate in opposite directions. Each of the chambers and associated parts is constructed as shown in Fig. 8, wherein pistons 35, 36, 37 and 38 are provided, pistons 35 and 36 being connected by the piston rod 39 while the pistons 37 and 38 are connected by piston rod 40. The rods 39 and 40 are connected by a cross bar 41 which is rigidly secured to the sleeve 42 loosely journaled on the shaft 43. A similar cross bar structure 41$^a$ is provided in chamber 33 for connecting the rods 44$^a$ and 44$^b$ of pistons 44, 45, 46 and 47 of chamber 33, as shown in Fig. 8.

As the parts are now positioned the explosive mixture is compressed in the clearance space 48, said space being in free communication with a similar clearance space in chamber 33 by reason of the connecting passageway 49. When the combustible mixture is exploded by reason of the high pressure or by use of a spark from a spark plug used in starting, the pistons 35 and 46 will be forced apart and, consequently, piston 36 will compress air in chamber 34' while piston 47 will compress air in the chamber 33'. As above stated, a spark plug may be used for igniting the combustible mixture, but preferably the mixture is exploded by the heat generated during the compression of the mixture. In order that both of the pistons 35 and 46 may operate together and the parts connected therewith, a connecting mechanism is provided, as shown in Fig. 4, which includes a casing 42' having an internal rack forming an internally geared member which meshes with a plurality of pinions 50 rotatably mounted on studs rigidly secured to the wall 51 forming part of the casing 42'. Pinions 50 mesh with a master gear 52, which master gear is rigidly secured to the sleeve 42'', said sleeve in turn being rigidly secured to pistons 44, 45, 46 and 47 and a cross bar similar to the cross bar 41 by reason of the fact that the cross bar connects the pistons and is rigidly connected to or formed integral with the sleeve 42''. It will of course be understood that the sleeve 42 rotates in one direction while the sleeve 42'' rotates in the opposite direction, but by reason of the gear 52, pinions meshing therewith and associated parts, the pistons all operate in unison.

When the piston 35 is moved by the explosion of the combustible mixture, piston 36 will be forced toward the end 53 of the chamber 34'. As piston 36 moves from the position shown in Fig. 8 to the pipe 54, air will be forced from the chamber 34' into pipe 54 under a slight pressure, as for instance, ten pounds. After the piston 36 has covered the end of pipe 54 the air is compressed in the remaining part of chamber 34' and forced out the outlet member or pipe 17 into the pipe 19. As soon as the piston 36 passes the outlet 17 the remaining air is compressed in a confined space and thereby cushions the blow of the piston and in addition acts as means for giving the piston and associated parts a rebound. In this way, on each explosion air is compressed in the chamber 34' of each of the cylinders 33 and 34, while on the second explosion air will be compressed on the opposite side, namely, in the chamber 34'', as shown in Fig. 8. On one explosion the pistons 35 and 46 will be moved apart or in opposite directions, and on the next explosion the pistons 37 and 44 will be moved apart, as they coact in the same manner as the pistons 35 and 46. As the pistons 36 and 38 compress the air in chambers 34' and 34'' some of the air is passed through the various pipes 54 to the single pipe 55 which leads to the control valves 56, which control valves discharge into chamber 49. A carbureter 57 is provided of substantially the usual venturi type except that the air in the carbureter is supplied from pipe 55 instead of from the atmosphere and the oil may be supplied through a suitable float chamber in the carbureter.

From the carbureter 57 supply pipes 59 extend to the passageways 49 and from thence to the respective chambers 48 wherein the combustible mixture is compressed and exploded as heretofore described. It will be observed from Fig. 8 that after each explosion and expansion thereof, there is a continued movement of the pistons after the exhaust ports have opened, causing thereby a slight rarefication or drop of pressure, which permits the combustible mixture from the carbureter to enter for a second explosion. It will be understood that the explosive mixture from the carbureter is fed into the explosion chamber under some pressure so that it assists in cleaning out the explosion chamber of the unburnt gases. This manner of supplying combustible mixture and providing for the exhaust as well as the arrangement for a compression of the mixture, together with the extent of the oscillations of the pistons which vary according to the degree of cushioning effect not only supplied by the terminal cushioning pressure of the large air compression pistons but also by the terminal pressure effected on the fresh combustible mixture at the end of its compression stroke, gives a practically constant compression throughout the varying speed of the motor. The oscillations of the two adjacent pistons in their annular cylinders are therefore to a great extent controlled in their movement by the terminal pressure generated therebetween, and this in turn, due to its variable volume as controlled by the carbureter, varies the extent of the oscillations of the pistons. This variation in extent of oscillation, however, permits of a constant compression throughout the entire load and speed range of the motor. Therefore it is seen that the compression in this motor is always high and practically constant, and the clearance between the two pistons, as for instance pistons 35 and 46, varies with the volume of explosive mixture. By providing the communicating passageways 49 each pair of pistons, for instance, 35 and 46, and 37 and 44, enter a common cylinder or chamber in opposite directions and form therewith a clearance volume variable in accordance with the variations in the volume of the working fluid supplied at any time. By this construction and arrangement the maximum efficiency is secured from each charge of the combustible mixture, whether the same is large or small, which is not true where the movement of the piston is always the same in length and the working charge variably controlled, as found in the ordinary 4-cycle engine now on the market.

In order to control the internal combustion engine 2 and the compressor, manually operated means are provided as well as automatically operated means. The manually operated means include the controlling member or lever 15 and the connecting members 61 and 62, as shown in Figs. 1 and 7. The member 62 is connected with a beveled gear 63 which meshes with gear 64 connected with the shaft 65, while shaft 65 is connected with a beveled gear 66 meshing with the gear wheel 67. The gear wheel 67 is formed with a flat central portion 68 which acts as a valve member having openings or ports 69 designed to mesh at different times with the ports 70. When the gear 67 is in the position shown in Fig. 7 air cannot pass from the pipe 55 to the carbureter and, consequently, an explosive mixture cannot be fed to the explosion chambers. In case the compressed air is shut off from the expansive engine 3, as for instance, when the automobile is brought to a stop at a curbstone for a short time, the engine 2 will continue to operate and supply compressed air to the tank or container 16. When this air has reached a certain pressure it will act on the diaphragms 71 by reason of the pipe 72 connecting the diaphragms with the container 16. As the diaphragms 71 expand they will move pivotally the lever 73 so as to pull the rod 74 downwardly, as shown in Fig. 5. This downward movement acts on the rods 75 and 76 which are pivotally connected together at 77, until the rods form a straight line between the pivotal points 78 and 79.

This downward movement is permitted by the fact that the rods 75 and 76 are slidingly fitted into socket members 80 and 81, socket member 81 being rigidly secured to an arm 82 which is pivotally connected with the bar 83. As soon as the pivotal pin 77 moves slightly past the dead center the springs 84 and 85, acting on the rods 75 and 76, will suddenly move the various members to a position opposite that shown in Fig. 5 and thereby give the rod 83 a quick upward pull an appreciable distance. The bottom of rod 83 is provided with a rack 86 meshing with a pinion 87, which pinion is mounted on a shaft 88, as shown in Fig. 7, said shaft carrying a pinion 89 meshing with the automatic valve gear 90 which has a flat body formed with a plurality of ports or apertures 91 designed to be brought into registry at proper times with the ports 70 and 92 as well as with the port 69 of the gear 67. When all of these ports are in line and in line with the various ports 93 of the division plate 94, air may pass freely from the pipe 55 to the carbureter 57. When any of these ports are closed or partially closed, a corresponding reduction or shutting off of the air is produced. It will therefore be observed that the air may be completely shut off manually by operating the control lever 15 or may be automatically shut off partially or completely by the rise in pressure in the container 16. In connection with the control lever 15 and the connecting member 61 it will be noted that the member 61 has connected therewith by suitable universal connections, the rod 12, as shown in Fig. 3, so as to turn on and off the compressed air in order to control the action of the engine 3. It is of course evident that the control lever 62 could extend directly to the steering wheel 14 and be operated independently of the control lever 15 and member 61, though ordinarily this is not necessary or desired.

In addition to the above it will be noted that the two-way valve 20 is connected to the rod 83 by any suitable means, that shown being a system of bars and bell-crank levers whereby the compressor is automatically opened to the air simultaneously with the shutting off of the valve 90. As above set forth, the valve 90 is gradually closed as rod 83 gradually moves up during the expansion of the diaphragms 70, and when the rods 75 and 76 reach a certain point a sudden movement is given to rod 80 for almost completely closing the valve 90. However, the valve 90 is left open sufficiently to allow the engine to run idle, which requires but little power, as the compressor is automatically opened to the atmosphere by the shutting of the valve 20 when valve 90 is closed to its furthest extent, which as above stated, leaves a sufficient opening for enough combustible matter to keep the engine running idle. This construction relieves the engine and the compressor and utilizes a minimum amount of fuel while continually maintaining a proper pressure in the container 16 for any desired purpose.

In starting the internal combustion engine any suitable means may be provided, as for instance, an ordinary electric self-starter which will produce the ordinary back and forth movement of the pistons, or air under pressure could be utilized by connecting the air pressure to the valve 95, as shown in Figs. 8 and 9, and said valve oscillated to direct compressed air into the chambers 34' and 34" for acting on the compression pistons. If this is done the air is cut off before the pistons clear the various valves leading to the carbureter, as otherwise an undue pressure to the carbureter will be provided, though this may be prevented by shutting off, to a certain extent, manually, the valve member 67 shown in Fig. 7.

What I claim is:

1. In a mechanism of the type described, the combination of two annular cylinders sustained side by side, a common partition extending across the interior of the cylinders and provided with independent unchanging passages establishing cross connections between the two cylinders, which connections communicate with the cylinders respectively at opposite sides of said partition, solid partitions in said cylinders at points removed from the first mentioned partition, two power pistons in each cylinder disposed respectively at opposite sides of said first mentioned partition, two air compression pistons in each cylinder connected respectively with their associated power pistons, connections between the several pistons of each cylinder to cause said pistons to move together as a set, connections between the pistons of one cylinder and those of the other cylinder formed to cause the two sets of pistons to move in unison and relatively in opposite directions, said sets of pistons being free to move in the cylinders with a variable stroke floating action, and means for introducing combustible charges between the sets of power pistons of the two cylinders in alternation; whereby as each charge is fired, the coöperating power pistons of two cylinders will be moved away from each other and the connected air compression pistons will compress air in the two cylinders respectively at opposite sides of the solid partitions.

2. In an internal combustion engine, the combination of a pair of annular cylinders arranged side by side and cross-connected with each other by independent unchanging cross passages to form clearance chambers, said cylinders being provided with solid partitions closing the interiors of the same forming air compression chambers, and four pairs of variable stroke floating pistons in said cylinders, each pair comprising a power piston and a connected air compression piston, each pair of pistons in one annular cylinder being operatively connected with the opposing pair of pistons in the other cylinder to cause said opposing pairs to move in unison with each other but in opposite directions; whereby the expansion of the burning charge in the clearance chambers will move the power pistons outwardly from each other to cause the air compression pistons to compress air in the air compression chambers.

3. In an internal combustion engine, the combination of two cylinder structures arranged side by side and each comprising two arcuate cylinders closed at one of their ends to form air compression chambers, and cross-connected at their opposite ends by independent unchanging cross passages to form common clearance chambers connecting the end of each arcuate cylinder on one side with the end of the opposing cylinder on the other side, and a pair of connected power and air-compression variable stroke floating pistons in each arcuate cylinder, the pairs of pistons in the cylinders on one side being connected respectively with the pairs of pistons of the opposing cylinders on the other side to cause the connected pistons to move in unison but in opposite directions.

NATHANIEL B. WALES.